US005478433A

United States Patent [19]

Magalhaes

[11] Patent Number: 5,478,433

[45] Date of Patent: Dec. 26, 1995

[54] TRIPLE SEAM ROLLER

[76] Inventor: Alvaro Magalhaes, 4125 Gardner, The Colony, Tex. 75056

[21] Appl. No.: 264,043

[22] Filed: Jun. 22, 1994

[51] Int. Cl.$^6$ .......... B32B 31/00

[52] U.S. Cl. .......... 156/579; 156/523; 156/574

[58] Field of Search .......... 156/579, 574, 156/577, 523, 527

[56] References Cited

U.S. PATENT DOCUMENTS

| | | | |
|---|---|---|---|
| 2,166,332 | 7/1939 | Widder . | |
| 3,540,104 | 11/1970 | Duffy . | |
| 3,568,285 | 3/1971 | Lieberg . | |
| 3,909,341 | 9/1975 | Moscovita . | |
| 4,406,730 | 9/1983 | Altmix | 156/579 X |
| 4,452,663 | 6/1984 | Heaton . | |
| 4,750,968 | 6/1988 | Sweeny . | |
| 4,861,400 | 8/1989 | Sargent . | |
| 5,015,326 | 5/1981 | Frank | 156/574 X |
| 5,290,390 | 3/1994 | Roman et al. | 156/577 X |
| 5,316,614 | 5/1994 | Phillips | 156/523 X |

*Primary Examiner*—James Engel
*Attorney, Agent, or Firm*—David H. Judson

[57] ABSTRACT

A seam roller having a frame and a plurality of wheels for rolling and flattening wallpaper and the like is provided. The frame has two sides and each side has an angle formed therein. Two angled rollers are positioned on a first axle and a front roller positioned in front of the angled wheels is rotatably positioned on a second axle. Preferably, a separating wheel is positioned between the angled rollers on the first axle. A handle is attached to the frame for rolling the roller.

11 Claims, 2 Drawing Sheets

TRIPLE SEAM ROLLER

TECHNICAL FIELD

The present invention relates generally to a wallpaper roller and more particularly to a wallpaper roller having three rollers positioned such that two of the rollers function to pull pieces of wallpaper together and form a seam while the third roller is utilized to flatten the seam.

BACKGROUND OF THE INVENTION

Wallpaper rollers are well-known in the prior art. For example, U.S. Pat. No. 3,540,104 to Duffy discloses a wallpaper seam roller having one roller with a circular depression.

It is also known in the prior art to use a plurality of rollers. For instance, U.S. Pat. No. 4,861,400 to Sargent and U.S. Pat. No. 3,568,285 to Lieberg disclose seam rollers having multiple rollers. Additionally, U.S. Pat. No. 4,452,663 to Heaton discloses a wall board taping device having a plurality of rollers.

However, one of the disadvantages associated with the prior art has been the inability to provide a seam roller which automatically pulls two pieces of wallpaper together, forming a seam and then flattening the seam such that a smooth, precise wall-papered surface is thereby obtained. Another disadvantage associated with the prior art is that rollers often form seams between two pieces of wallpaper which are uneven or visible, thereby detracting from the aesthetic value of the wall-papered surface.

Yet another disadvantage associated with the prior art is that the seams between two pieces of wallpaper often separate, causing the wallpaper to rip or tear. This in part due to the fact that the adhesive is not applied to the pieces of wallpaper at the same time and the adhesive thus dries improperly.

It would therefore be desirable to provide a seam roller which overcomes the shortcomings associated with the prior art.

BRIEF SUMMARY OF THE INVENTION

It is an object of the present invention to provide a seam roller which automatically pulls pieces of wallpaper together, thereby forming a seam.

It is another object of the present invention to provide a seam roller which flattens the seam such that the seam remains intact after the adhesive on the paper dries.

It is yet another object of the present invention to provide a seam roller which rolls the seams on wallpaper in a manner that is cost-effective and simple to use.

It is still another object of the present invention to provide a seam roller which allows wallpaper to be rolled in a manner that is faster than previous techniques of rolling seams together.

It is yet a further object of the present invention to provide a seam roller which is suitable for use with a variety of different wallpapers and the like.

Still another object of the invention is to provide a seam roller which is capable of pressing two pieces of paper together at substantially the same time such that the glue or adhesive dries near the seam first, thereby strengthening the seam between the two pieces of paper.

These and other objects of the invention are provided in a triple seam roller in which two angled rollers act together to pull two pieces of wallpaper together, thereby forming a seam while a third roller is used to flatten the seam formed thereby.

Preferably, the frame is formed with a 45° angle therein. This facilitates movement of the rollers in an appropriate manner.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
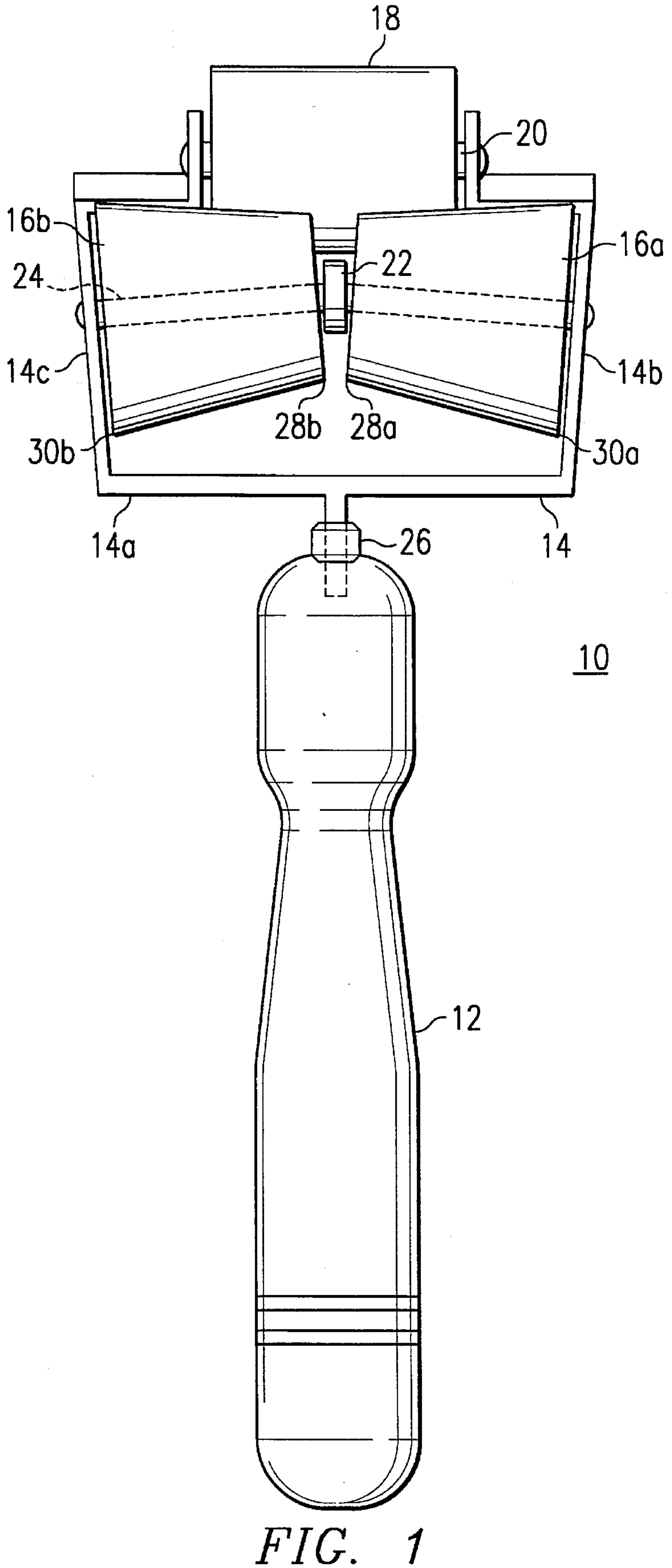
FIG. 1 is a plan view of a triple seam roller in accordance with the present invention.

Referring now to FIG. 1, a plan view of a triple seam roller in accordance with the invention is illustrated. The seam roller 10 includes handle 12, frame 14, two angled rollers **16*a*, 16*b* and front roller 18. While not meant to be limiting, handle 12 is preferably formed of wood and is about 4.5" long and 0.5–1" in diameter. While handle 12** may be longer or wider, a handle of about 4.5"×1" provides greater control over the movement of the roller.

Figure 2:
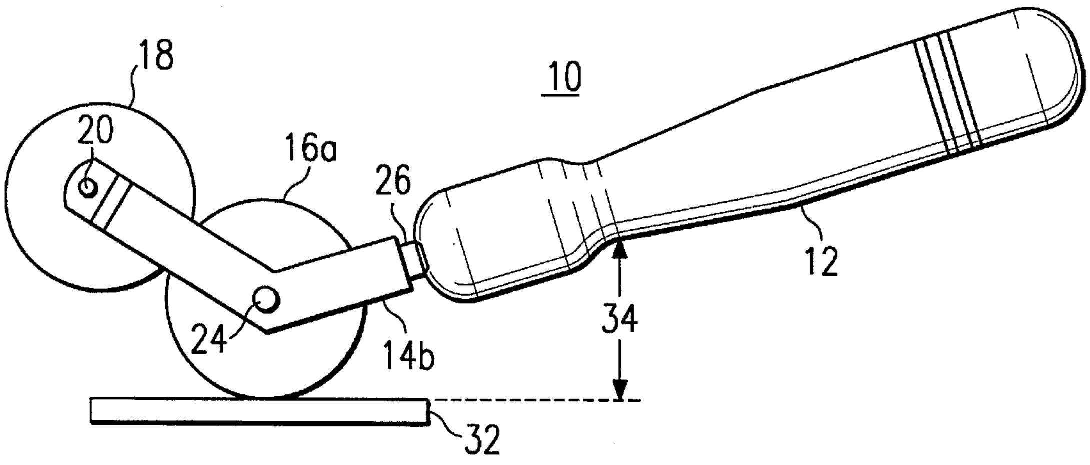
FIG. 2 is a side view of a triple seam roller in which the angled rollers are in contact with wallpaper in accordance with the present invention.
Figure 3:
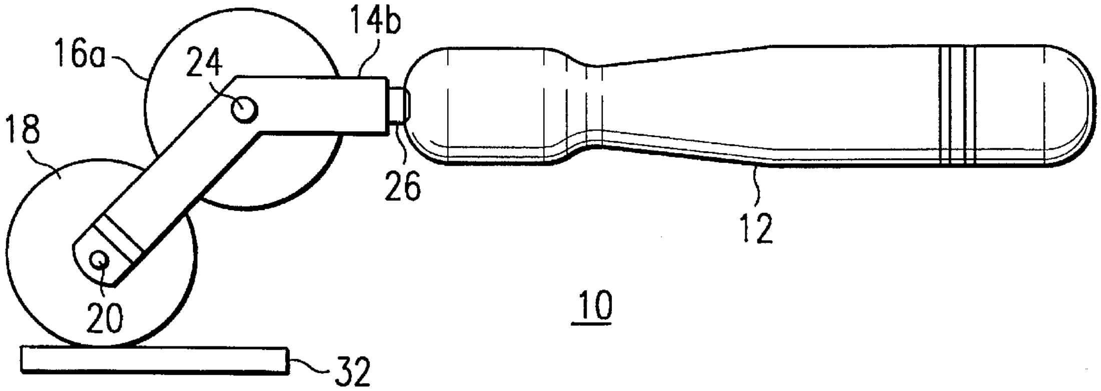
FIG. 3 is a side view of a triple seam roller in which the front roller is in contact with wallpaper according to the present invention.

In a preferred embodiment, end **14*a* of frame 14 extends perpendicular to handle 12 and is about 2.5 inches in length. Sides 14*b* and 14*c* of frame 14 are preferably angled. As illustrated in FIGS. 2 and 3, sides 14*b* and 14*c* (not shown in FIGS. 2 and 3) of frame 14 are each preferably formed with an angle of about 45° formed therein. As further shown in FIG. 2, the angle in sides 14*b* and 14*c* allow angled rollers 16*a* and 16*b* to contact the surface 32 being wall-papered or the like while roller 18 is maintained free of contact with surface 32. Similarly, the angles in sides 14*b* and 14*c* allow roller 18 to be used on surface 32 while rollers 16*a* and 16*b* are maintained free of contact with surface 32 as illustrated in FIG. 3**.

While frame 14 may be formed of any material which is relatively rigid so as to withstand the stress applied when the roller is in use, frame 14 is preferably formed of metal. While not meant to be limiting, handle 12 is attached to frame 14 by cap 26. However, it should be noted that handle 12 may be attached to frame 14 by any suitable means. Cap 26 may also be formed of any material capable of withstanding the stress applied to the roller, but is preferably formed of metal. Cap 26 preferably measures about 0.5 inches in diameter and about 0.5" in height.

Referring back to FIG. 1, angled rollers 16_a_ and 16_b_ are positioned on angled axle 24. Angled axle 24 has an angle of about 10–25° formed therein. Axle 24 is preferably positioned at the angled portion in sides 14_b_ and 14_c_ of frame 14, as shown in FIGS. 2 and 3. Front roller 18 is positioned on front axle 20. Front axle 20 contains no angles. Axles 20 and 24 are preferably formed of metal or the like.

Rollers 16_a_ and 16_b_ each have inner surfaces 28_a_ and 28_b_, and outer surfaces 30_a_ and 30_b_, respectively. While not meant to be limiting, inner surfaces 28_a_ and 28_b_ are preferably about 1 inch in diameter while outer surfaces 30_a_ and 30_b_ are each approximately 1.5 inches in diameter.

Separating wheel 22 is positioned on angled axle 24 between rollers 16_a_ and 16_b_. Preferably, wheel 22 is positioned equidistant from the sides 14_b_ and 14_c_ of frame 14. Wheel 22 acts to separate rollers 16_a_ and 16_b_. In a preferred embodiment, wheel 22 is mounted on axle 24 and does not rotate about axle 24.

Roller 18 is positioned in front of rollers 16_a_ and 16_b_ at an angle with respect thereto such that when angled rollers 16_a_ and 16_b_ contact paper 32 as shown in FIG. 2, roller 18 is in front of and above rollers 16_a_ and 16_b_. As shown in FIG. 3, however, roller 18 is positioned in front of and below rollers 16_a_ and 16_b_ when roller 18 is in contact with paper 32. Rollers 16_a_, 16_b_, 18 and wheels 22 may be formed of wood, plastic, metal or the like.

The triple seam roller 10 of the present invention operates in the following manner. Two segments or pieces of paper 32 are applied approximately parallel and in close proximity to one another on a wall or surface to be covered. Triple seam roller 10 is then applied to paper 32 as shown in FIG. 2 such that rollers 16_a_ and 16_b_ each contact an edge of the pieces of paper. Pressure is applied to roller 10 such that rollers 16_a_ and 16_b_ pull the pieces of paper 32 in towards one another until a seam between the two pieces of paper is thereby formed. Roller 10 is rolled along the entire length of the pieces of paper in a first stroke or movement so that the seam extends along the entire length of the papers.

Handle 12 is preferably held at an angle 34 relative to surface 32, as shown in FIG. 2. In a preferred embodiment, angle 34 is about 45°. In this manner, inner surfaces 28_a_ and 28_b_ remain in contact with surface 32. When handle 12 is held at an angle almost parallel to surface 32 such that angle 34 is almost 0, inner surfaces 28_a_ and 28_b_ may no longer contact surface 32, thereby reducing the effectiveness in which the pieces of paper are pulled together. However, it should be noted that when the angle 34 is much greater than 45°, roller 18 may contact surface 32 prior to contact by rollers 16_a_ and 16_b_, thereby flattening the paper prior to forming the seam.

After the first stroke or movement has been completed, roller 10 is then inverted as illustrated in FIG. 3. Front roller 18 is thus placed in contact with paper 32. Front roller 18 is rolled along the entire length of the seam created by rollers 16_a_ and 16_b_ in a second stroke or movement. In this manner, the seam is flattened. When the adhesive used to attach the paper to the wall or surface dries, the seams remain in tact. While the angle between handle 12 and surface 32 during the second stroke or movement is not critical, handle 12 should be at an angle such that the user's hand does not contact surface 32. Rollers 16_a_, 16_b_ and 18 also function to provide an even distribution of the adhesive used to apply the wallpaper to the surface.

In an alternative embodiment of the present invention, axle 24 is formed such that the angle in axle 24 is automatically adjustable. In this embodiment, the angle 34 is not as important during the first stroke since adjustable axle 24 maintains inner surfaces 28_a_ and 28_b_ in contact with surface 32 to provide maximum effectiveness in forming a seam between two pieces of paper. Axle 24 may be made adjustable in various ways. For example and while not meant to be limiting, axle 24 may be formed of a resilient material which allows the angle in axle 24 to decrease when stress is applied thereto. Alternatively, axle 24 may be attached to sides 14_b_ and 14_c_ of frame 14 such that the ends of axle 24 protrude or extend out from the sides 14_b_ and 14_c_ when the angle formed in axle 24 is flattened or decreased. Accordingly, inner surfaces 28_a_ and 28_b_ may remain in contact with surface 32 during the first stroke.

The present invention thus provides a distinct advantage over the prior art by rolling seams of paper together in a manner that is both faster and simpler than prior art techniques. In particular, the seam roller of the present invention insures that the seam formed between two pieces of paper is smooth and even. Additionally, the seam roller of the present invention insures that the adhesive used to apply the wallpaper to a particular surface is uniformly distributed on the surface. The seam roller is suitable for use with a variety of different wallpapers, thereby decreasing the need for many different rollers. Moreover, the triple seam roller of the present invention is self-contained and compact for convenient travel.

Another distinct advantage of the seam roller of the present invention is the ability to apply two pieces of wallpaper together such that the adhesive is forced towards the seam between the pieces of wallpaper. In this manner, the adhesive is allowed to dry faster at the seam than seams created by seam rollers in accordance with the prior art. Consequently, wallpaper applied using a seam roller according to the present invention provides stronger seams which are more resistant to tearing, peeling, ripping and the like.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A seam roller, comprising:

a frame having an end and two sides, the sides of the frame each having a first end and a second end and each side having an angle formed therein;

a first axle attached to the frame, the axle having an angle formed therein;

a plurality of angled rollers, each roller having a first end and a second end, the first end of each roller positioned towards the center of the first axle and rotatably attached thereto, wherein the diameter of the first end is less than that of the second end;

a second axle attached to the second ends of the sides of the frame;

a front roller rotatably attached to the second axle; and a handle having a first end and a second end, the first end of the handle attached to the end of the frame.

2. The seam roller as described in claim 1 wherein the number of angled rollers is two.

3. The seam roller as described in claim 2 further including a separating wheel positioned on the first axle between the angled rollers.

4. The seam roller as described in claim 1 wherein the angle formed in each of the sides of the frame is about 45°.

5. The seam roller as described in claim 1 wherein the angle formed in the first axle is about 10°.

6. The seam roller as described in claim 5 wherein the angle formed in the second axle extends in the same direction as the angles formed in the sides of the frame.

7. The seam roller as described in claim 1 wherein the handle is formed of wood.

8. The seam roller as described in claim 1 wherein the frame, first axle and second axle are each formed of metal.

9. The seam roller as described in claim 1 wherein the front roller and angled rollers are each formed of plastic.

10. The seam roller as described in claim 1 wherein the front roller and angled rollers are each formed of wood.

11. The seam roller as described in claim 1 further including a cap positioned between the first end of the handle and the first end of the frame and attached thereto.

* * * * *